(12) United States Patent
Tsai et al.

(10) Patent No.: US 10,658,135 B1
(45) Date of Patent: May 19, 2020

(54) KEYBOARD KEY STRUCTURE THAT GENERATES AN OPERATION SOUND

(71) Applicant: Primax Electronics Ltd., Taipei (TW)

(72) Inventors: Sheng-An Tsai, Taipei (TW); Li-Jen Chien, Taipei (TW); Hsiang-Wen Cheng, Taipei (TW)

(73) Assignee: PRIMAX ELECTRONICS LTD., Taipei (TW)

(*) Notice: Subject to any disclaimer, the term of this patent is extended or adjusted under 35 U.S.C. 154(b) by 0 days.

(21) Appl. No.: 16/286,249

(22) Filed: Feb. 26, 2019

(30) Foreign Application Priority Data

Dec. 7, 2018 (TW) .............................. 107144183 A

(51) Int. Cl.
*G06F 3/02* (2006.01)
*H01H 13/705* (2006.01)
*H01H 13/84* (2006.01)
*H01H 13/85* (2006.01)
*H01H 13/7065* (2006.01)

(52) U.S. Cl.
CPC ........... *H01H 13/84* (2013.01); *G06F 3/0202* (2013.01); *H01H 13/705* (2013.01); *H01H 13/7065* (2013.01); *H01H 13/85* (2013.01); *H01H 2215/03* (2013.01)

(58) Field of Classification Search
CPC .. H01H 2215/03; H01H 13/14; H01H 13/705; H01H 13/85; H01H 13/20; G06F 3/0202
See application file for complete search history.

(56) References Cited

U.S. PATENT DOCUMENTS 10,109,437 B1 * 10/2018 Li ........................... H01H 13/85
10,431,402 B2 * 10/2019 Hsieh ..................... H01H 13/04

* cited by examiner

*Primary Examiner* — Vanessa Girardi
(74) *Attorney, Agent, or Firm* — Kirton McConkie; Evan R. Witt

(57) ABSTRACT

A keyboard device includes a key structure, a membrane wiring board and an elastic element. The elastic element is arranged between the key structure and the membrane wiring board. The key structure includes a sleeve, a plunger-type support shaft, a keycap and a resilience element. The plunger-type support shaft is movable upwardly or downwardly relative to the sleeve. When the keycap is depressed in response to an external force, the resilience element and the sleeve interfere with each other. Consequently, the keyboard device provides the operating sound and the operating feedback like a mechanical switch.

14 Claims, 15 Drawing Sheets

KEYBOARD KEY STRUCTURE THAT GENERATES AN OPERATION SOUND

FIELD OF THE INVENTION

The present invention relates to an input device, and more particularly to a keyboard device.

BACKGROUND OF THE INVENTION

Generally, the widely-used peripheral input device of a computer system includes for example a mouse device, a keyboard device, a trackball device, or the like. Via the keyboard device, characters or symbols can be inputted into the computer system directly. As a consequence, most users pay much attention to the keyboard devices.

Hereinafter, the structure and function of a conventional keyboard device with a mechanical key structure will be described with reference to FIGS. 1 and 2. FIG. 1 is a schematic cross-sectional view illustrating a conventional keyboard device with a mechanical key structure. FIG. 2 is a schematic cross-sectional view illustrating the mechanical switch of the conventional keyboard device of FIG. 1, wherein a keycap of the mechanical key structure is depressed. For succinctness, only one mechanical key structure and associated components are shown in FIGS. 1 and 2. The keyboard device 2 comprises plural mechanical key structures 22 and a circuit board 21. Each mechanical key structure 22 comprises a keycap 221 and a mechanical switch 224. The mechanical switch 224 is arranged between the keycap 221 and the circuit board 21. The mechanical switch 224 comprises a casing 2241, a push element 2242, a linkage element 2243, a first spring strip 2244, a second spring strip 2245 and an elastic element 2246. The linkage element 2243, the elastic element 2246, at least a part of the push element 2242, at least a part of the first spring strip 2244 and at least a part of the second spring strip 2245 are accommodated within the casing 2241.

The casing 2241 comprises a pedestal 22411 and an upper cover 22412. The pedestal 22411 is covered by the upper cover 22412. Moreover, the upper cover 22412 has an upper cover opening 22413. A first end of the push element 2242 is penetrated through the upper cover opening 22413 and contacted with the keycap 221. A second end of the push element 2242 is disposed within the casing 2241 and connected with the linkage element 2243. The linkage element 2243 is located at a middle region of the pedestal 22411. Moreover, the linkage element 2243 is movable upwardly or downwardly relative to the pedestal 22411. The linkage element 2243 has a protrusion structure 22431. The protrusion structure 22431 is extended from a sidewall of the linkage element 2243 and toward the first spring strip 2244. The elastic element 2246 is located under the linkage element 2243. A first end of the elastic element 2246 is connected with the linkage element 2243. A second end of the elastic element 2246 is fixed on the pedestal 22411. Moreover, the elastic element 2246 provides an elastic force to the linkage element 2243.

The first spring strip 2244 is located near a sidewall of the pedestal 22411. The first spring strip 2244 comprises a first electric connection part 22441, an elastic part 22442 and a first fixing part 22443. The first fixing part 22443 is fixed on the pedestal 22411. Moreover, the first fixing part 22443 is arranged between the first electric connection part 22441 and the elastic part 22442. The elastic part 22442 is disposed within the casing 2241 and contacted with the protrusion structure 22431 of the linkage element 2243. Moreover, the elastic part 22442 can be swung relative to the first fixing part 22443. After the first electric connection part 22441 is penetrated downwardly through the pedestal 22411, the first electric connection part 22441 is contacted and electrically connected with the circuit board 21. The second spring strip 2245 is arranged between the linkage element 2243 and the first spring strip 2244. The second spring strip 2245 comprises a second electric connection part 22451, a conduction part 22452 and a second fixing part 22453. The second fixing part 22453 is fixed on the pedestal 22411. Moreover, the second fixing part 22453 is arranged between the second electric connection part 22451 and the conduction part 22452. The conduction part 22452 is disposed within the casing 2241. After the second electric connection part 22451 is penetrated downwardly through the pedestal 22411, the second electric connection part 22451 is contacted and electrically connected with the circuit board 21.

While the keycap 221 is depressed, the keycap 221 is moved downwardly to push the push element 2242. Since the linkage element 2243 is connected with the push element 2242, the linkage element 2243 is moved downwardly with the push element 2242. At the same time, the elastic element 2246 is compressed to generate the elastic force. As the linkage element 2243 is moved downwardly, the protrusion structure 22431 of the linkage element 2243 is contacted with the elastic part 22442 of the first spring strip 2244. Moreover, the protrusion structure 22431 is moved downwardly relative to the elastic part 22442 so as to push the elastic part 22442. Consequently, the elastic part 22442 is swung relative to the first fixing part 22443. As the linkage element 2243 is continuously moved downwardly, the swung elastic part 22442 correspondingly contacts and collides with the conduction part 22452 of the second spring strip 2245. Meanwhile, as shown in FIG. 2, the first spring strip 2244 and the second spring strip 2245 are in contact with each other. Consequently, the circuit board 21 generates a corresponding key signal.

When the elastic part 22442 of the first spring strip 2244 collides with the conduction part 22452 of the second spring strip 2245, a click sound is generated. Due to the click sound, the user can feel the feedback of depressing the keycap 221. Moreover, when the keycap 221 is no longer depressed, the linkage element 2243 and the push element 2242 are moved upwardly in response to the elastic force of the elastic element 2246. Consequently, the keycap 221 is returned to its original position as shown in FIG. 1. The operations of the mechanical switch 224 are well known to those skilled in the art, and are not redundantly described herein. The type of the mechanical switch 224 is not restricted to that of FIGS. 1 and 2.

However, the mechanical switch still has some drawbacks. For example, since the structure of the mechanical switch is complicated, the fabricating cost of the mechanical switch is high. Moreover, it is difficult to reduce the thickness of the keyboard device with the mechanical switch. That is, the keyboard device with the mechanical switch cannot meet the requirements of light weightiness, slimness and small size. For solving these drawbacks, a keyboard device with a membrane switch has been introduced into the market.

Please refer to FIGS. 3 and 4. FIG. 3 is a schematic side view illustrating a conventional keyboard device with a membrane switch. FIG. 4 is a schematic exploded view illustrating a portion of a membrane wiring board of the conventional keyboard device of FIG. 3. The conventional keyboard device 1 comprises a base plate 13, a membrane wiring board 14 and plural key structures 12. Each of the plural key structures 12 comprises a keycap 121, a scissors-type connecting element 122 and an elastic element 123. The scissors-type connecting element 122 is connected between the keycap 121 and the base plate 13. Moreover, the scissors-type connecting element 122 comprises a first frame 1221 and a second frame 1222. The second frame 1222 is pivotally coupled to the first frame 1221. Consequently, the first frame 1221 and the second frame 1222 can be swung relative to each other. The elastic element 123 is arranged between the keycap 121 and the membrane wiring board 14. Moreover, the elastic element 123 comprises a contacting part 1231.

The membrane wiring board 14 comprises an upper film layer 142, a lower film layer 141 and an intermediate film layer 143. The intermediate film layer 143 is arranged between the upper film layer 142 and the lower film layer 141. A first circuit pattern 1421 is formed on a bottom surface of the upper film layer 142. The first circuit pattern 1421 comprises plural upper contacts 14211 corresponding to the plural key structures 12. A second circuit pattern 1411 is formed on a top surface of the lower film layer 141. The second circuit pattern 1411 comprises plural lower contacts 14111 corresponding to the plural upper contacts 14211. In addition, the intermediate film layer 143 comprises plural perforations 1431 corresponding to the plural upper contacts 14211 and the plural lower contacts 14111. Each of the upper contacts 14211 and the corresponding lower contact 14111 are collectively defined as a membrane switch 144.

While the keycap 121 of any key structure 12 is depressed and moved downwardly relative to the base plate 13, the first frame 1221 and the second frame 1222 of the scissors-type connecting element 122 are switched from an open-scissors state to a stacked state. Moreover, as the keycap 121 is moved downwardly to compress the elastic element 123, the corresponding upper contact 14211 is contacted with and triggered by the contacting part 1231 of the elastic element 123. Consequently, the corresponding upper contact 14211 is penetrated through the corresponding perforation 1431 and contacted with the corresponding lower contact 14111. Under this circumstance, the corresponding membrane switch 144 is electrically conducted. When the keycap 121 of the key structure 12 is no longer depressed, the keycap 121 is moved upwardly relative to the base plate 13 in response to an elastic force of the elastic element 123. Meanwhile, the first frame 1221 and the second frame 1222 are switched from the stacked state to the open-scissors state again, and the keycap 121 is returned to its original position.

As mentioned above, the keyboard device with the membrane switch is slim, and the fabricating cost is reduced. However, unlike the mechanical switch, the depressing action on the membrane switch cannot generate the click sound. That is, the user cannot feel the feedback of depressing the keycap. Consequently, the conventional keyboard device needs to be further improved.

SUMMARY OF THE INVENTION

An object of the present invention a novel key structure with a plunger-type support shaft and a sleeve. The plunger-type support shaft is movable upwardly or downwardly relative to the sleeve. A resilience element is disposed on the plunger-type support shaft. The resilience element and the sleeve may interfere with each other. Consequently, the keyboard device provides an operating sound and an operating feedback like a mechanical switch.

Another object of the present invention provides a keyboard device with the novel key structure and a membrane switch.

In accordance with an aspect of the present invention, there is provided a key structure. The key structure includes a sleeve, a plunger-type support shaft, a keycap and a resilience element. The sleeve includes a sliding groove and a stopping structure. The stopping structure is disposed within the sliding groove. A first end of the plunger-type support shaft is inserted into the sliding groove. The plunger-type support shaft is movable upwardly or downwardly relative to the sliding groove. The keycap is connected with a second end of the plunger-type support shaft. The resilience element is disposed on the plunger-type support shaft and movable with the plunger-type support shaft. While the plunger-type support shaft is moved upwardly or downwardly relative to the sliding groove, the resilience element and the stopping structure interfere with each other, so that the key structure generates an operating sound.

In accordance with another aspect of the present invention, there is provided a keyboard device. The keyboard device includes a key structure, a membrane wiring board and an elastic element. The key structure includes a sleeve, a plunger-type support shaft, a keycap and a resilience element. The sleeve includes a sliding groove and a stopping structure. The stopping structure is disposed within the sliding groove. A first end of the plunger-type support shaft is inserted into the sliding groove. The plunger-type support shaft is movable upwardly or downwardly relative to the sliding groove. The keycap is connected with a second end of the plunger-type support shaft. The resilience element is disposed on the plunger-type support shaft and movable with the plunger-type support shaft. While the plunger-type support shaft is moved upwardly or downwardly relative to the sliding groove, the resilience element and the stopping structure interfere with each other, so that the key structure generates an operating sound. The membrane wiring board includes a membrane switch. The elastic element is arranged between the key structure and the membrane wiring board. When the elastic element is pressed by the plunger-type support shaft, the membrane switch is triggered by the elastic element.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
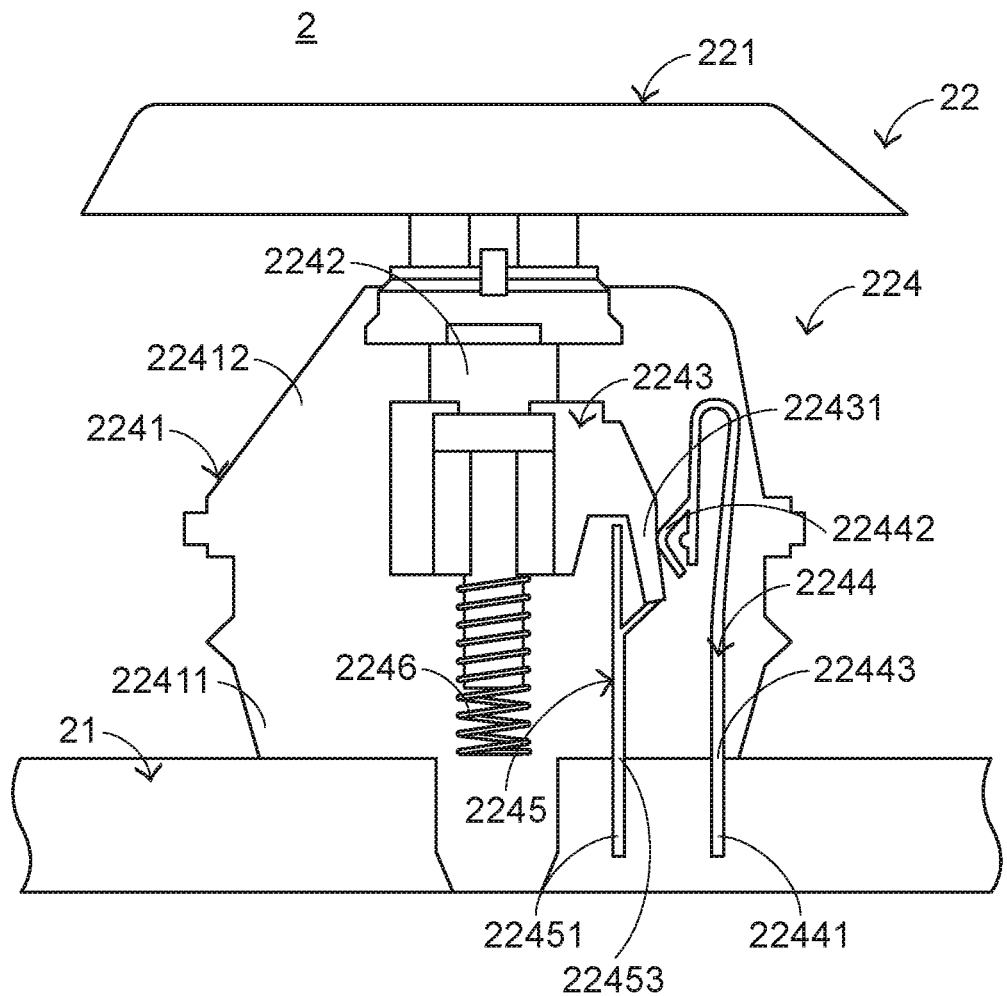
FIG. 1 is a schematic cross-sectional view illustrating a conventional keyboard device with a mechanical key structure.
Figure 2:
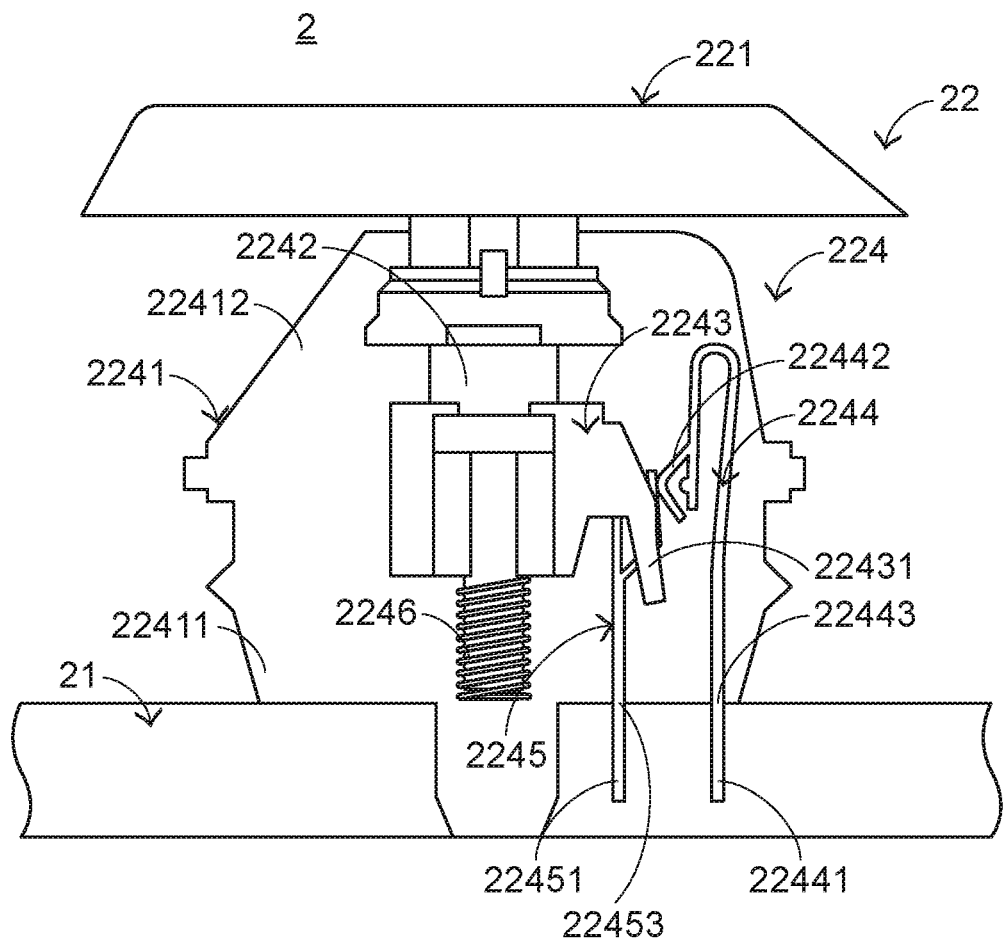
FIG. 2 is a schematic cross-sectional view illustrating the mechanical switch of the conventional keyboard device of FIG. 1, wherein a keycap of the mechanical key structure is depressed.
Figure 3:
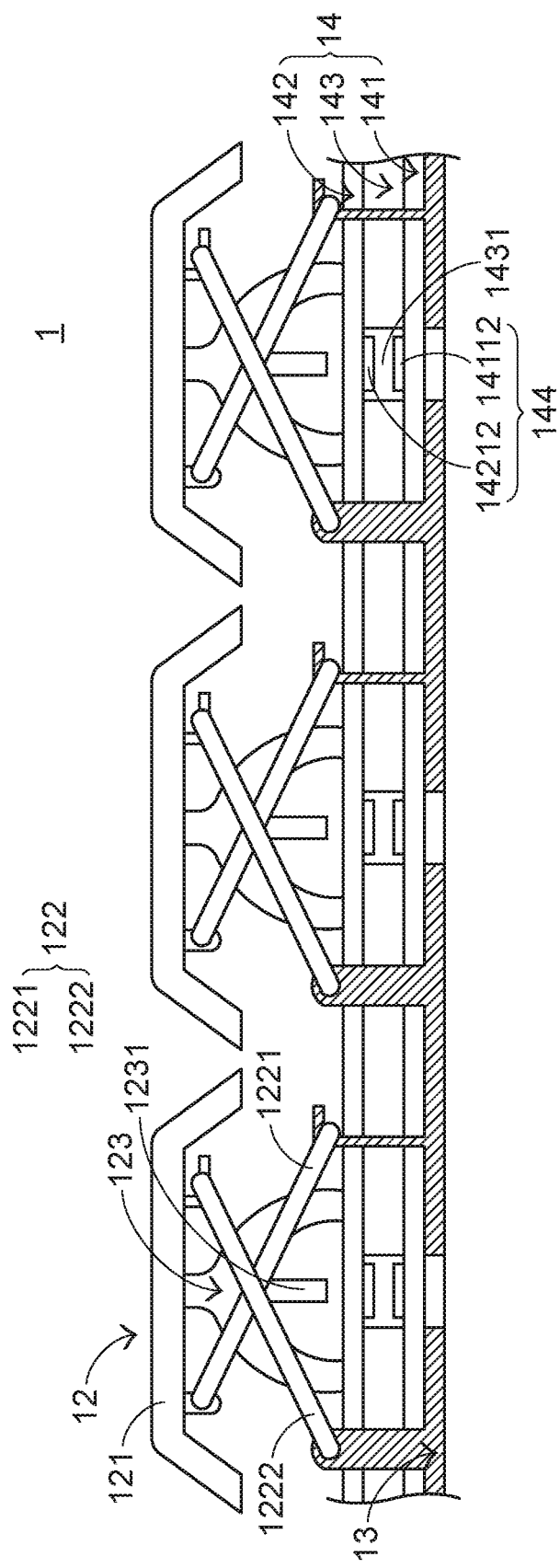
FIG. 3 is a schematic side view illustrating a conventional keyboard device with a membrane switch.
Figure 4:
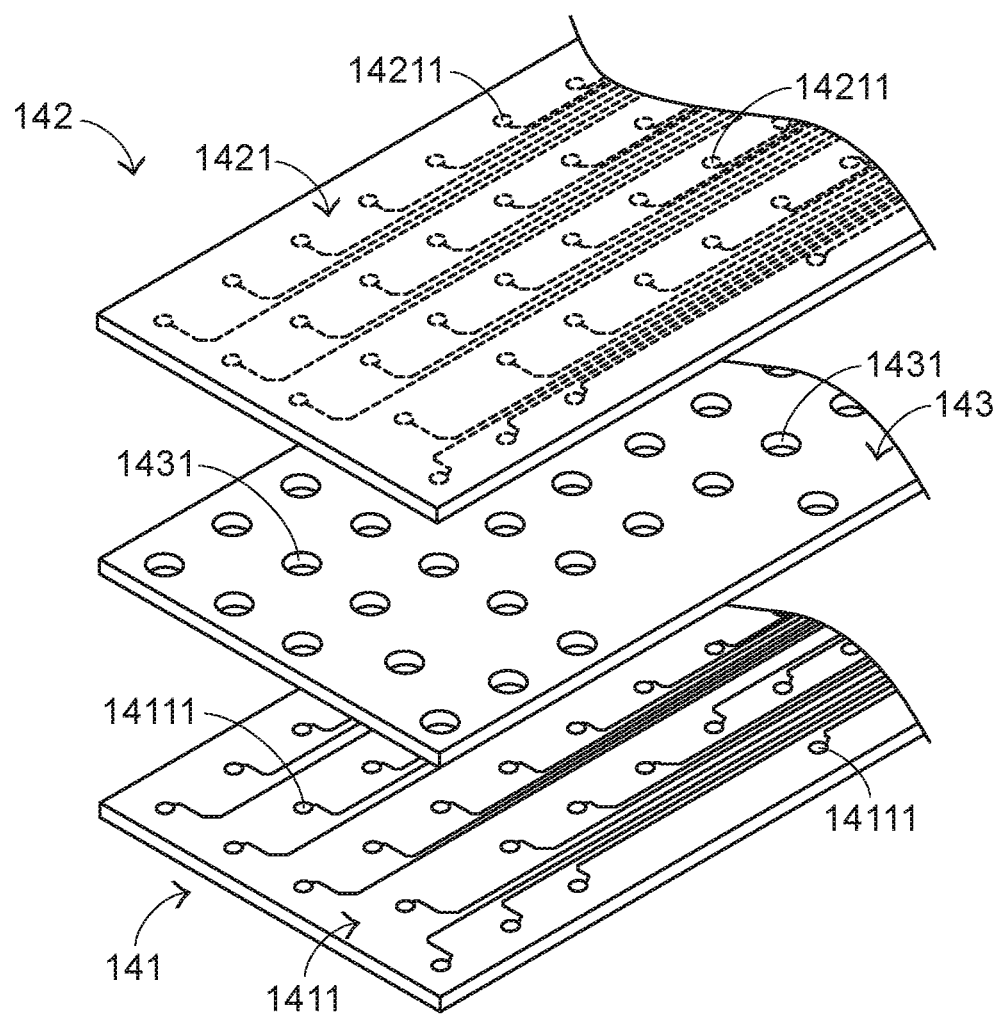
FIG. 4 is a schematic exploded view illustrating a portion of a membrane wiring board of the conventional keyboard device of FIG. 3.
Figure 5:
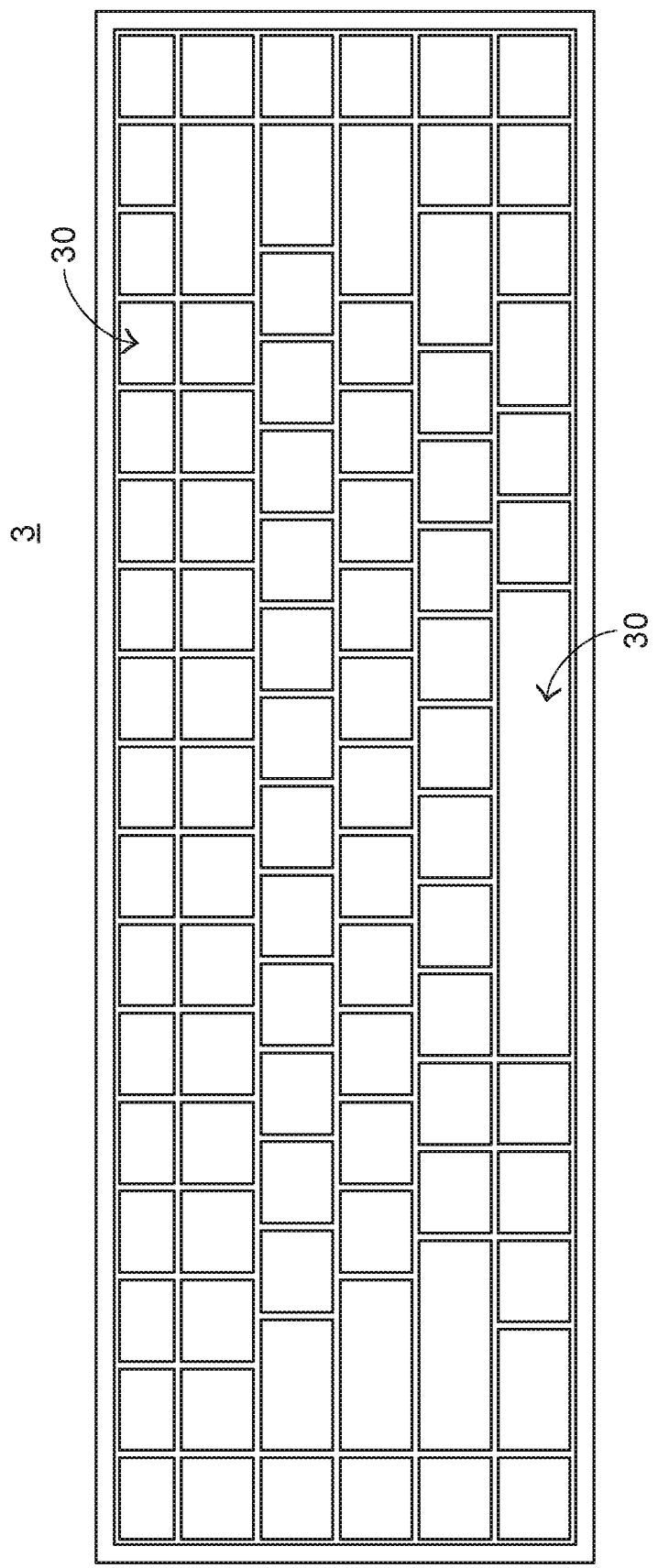
FIG. 5 is a schematic top view illustrating a keyboard device according to a first embodiment of the present invention.
Figure 6:
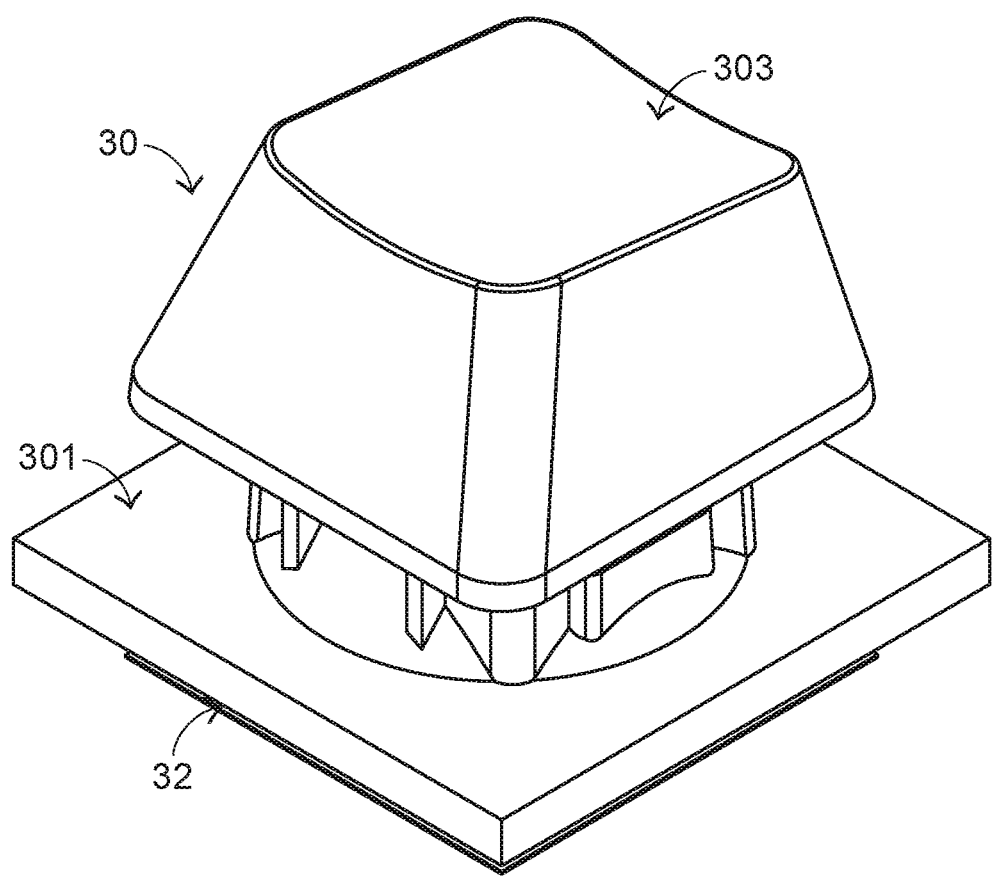
FIG. 6 is a schematic perspective view illustrating a portion of the keyboard device as shown in FIG. 5.
Figure 7A:
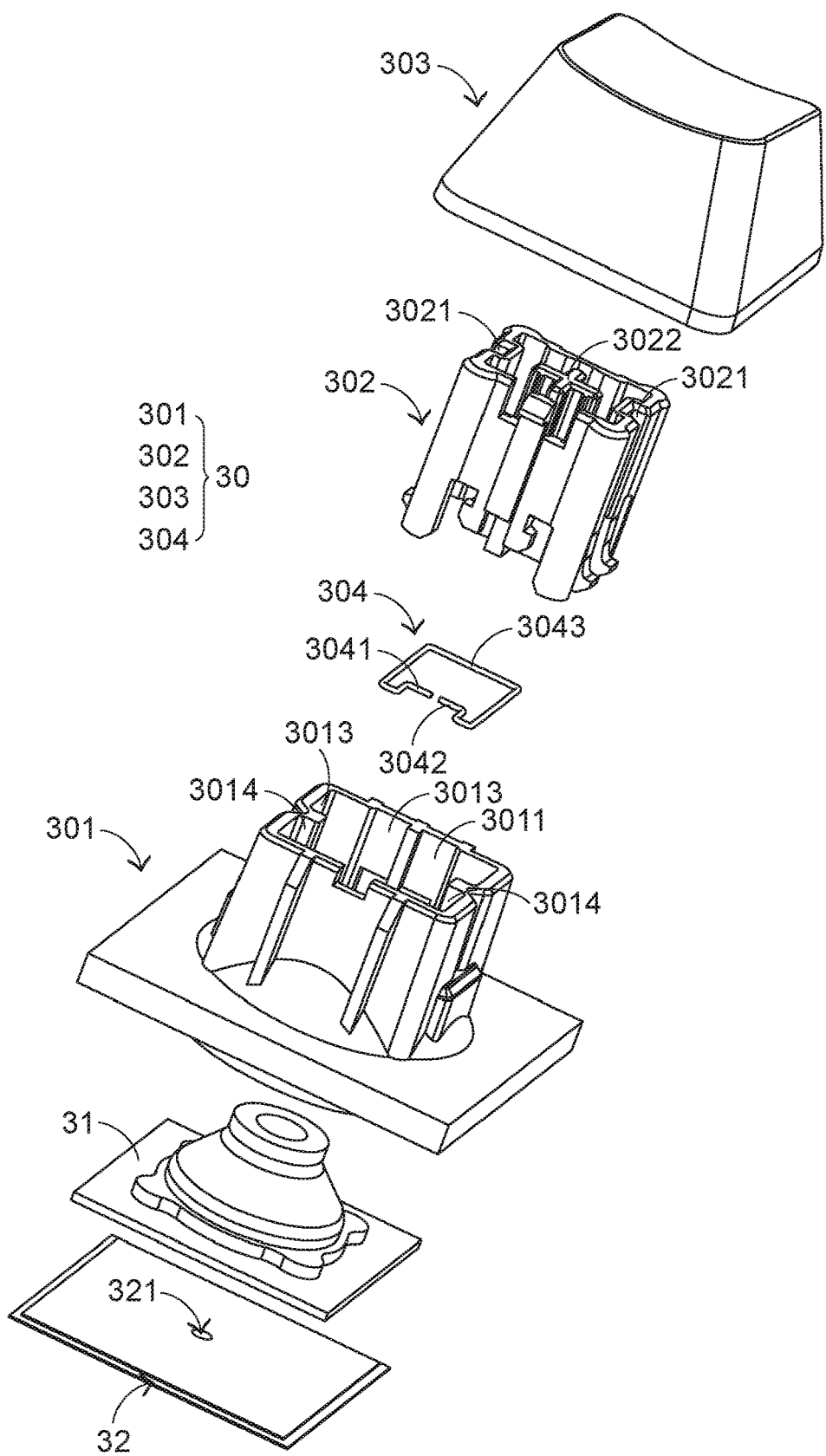
FIG. 7A is a schematic exploded view illustrating a portion of the keyboard device as shown in FIG. 5 and taken along a viewpoint.
Figure 7B:
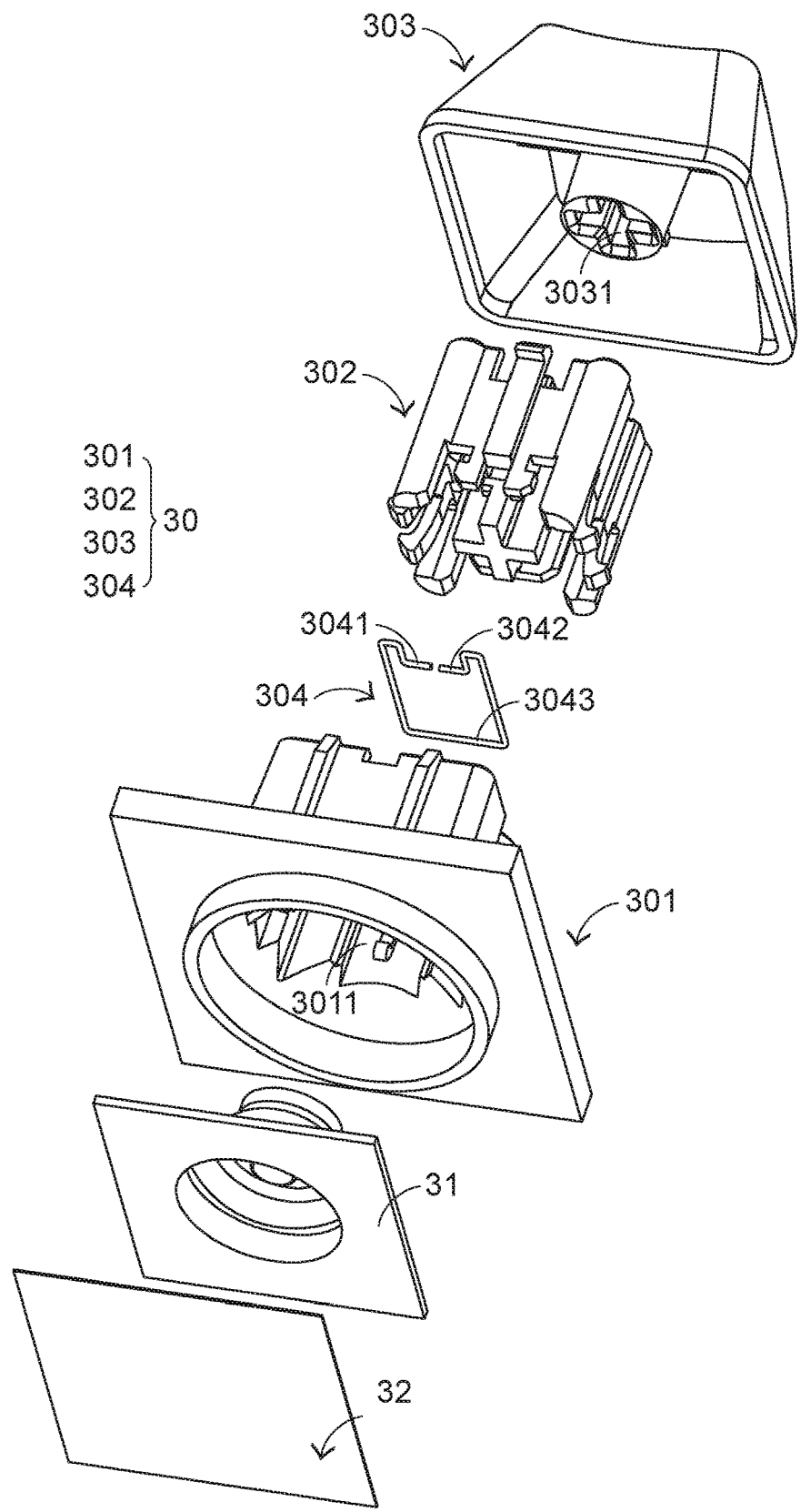
FIG. 7B is a schematic exploded view illustrating a portion of the keyboard device as shown in FIG. 5 and taken along another viewpoint.

Please refer to FIGS. 5, 6, 7A and 7B. FIG. 5 is a schematic top view illustrating a keyboard device according to a first embodiment of the present invention. FIG. 6 is a schematic perspective view illustrating a portion of the keyboard device as shown in FIG. 5. FIG. 7A is a schematic exploded view illustrating a portion of the keyboard device as shown in FIG. 5 and taken along a viewpoint. FIG. 7B is a schematic exploded view illustrating a portion of the keyboard device as shown in FIG. 5 and taken along another viewpoint. For succinctness, only one key structure is shown in FIGS. 6, 7A and 7B. The keyboard device 3 comprises plural key structures 30, a base plate (not shown), a membrane wiring board 32 and an elastic element 31. The membrane wiring board 32 is disposed on the base plate. The elastic element 31 is arranged between the membrane wiring board 32 and the key structures 30. These key structures 30 are classified into some types, e.g., ordinary keys, numeric keys and function keys. When one of the key structures 30 is depressed by the user's finger, a corresponding key signal is generated to the computer (not shown), and thus the computer executes a function corresponding to the depressed key structure. For example, when an ordinary key is depressed, a corresponding English letter or symbol is inputted into the computer. When a numeric key is depressed, a corresponding number is inputted into the computer. In addition, the function keys (F1-F12) can be programmed to provide various quick access functions.

Figure 8:
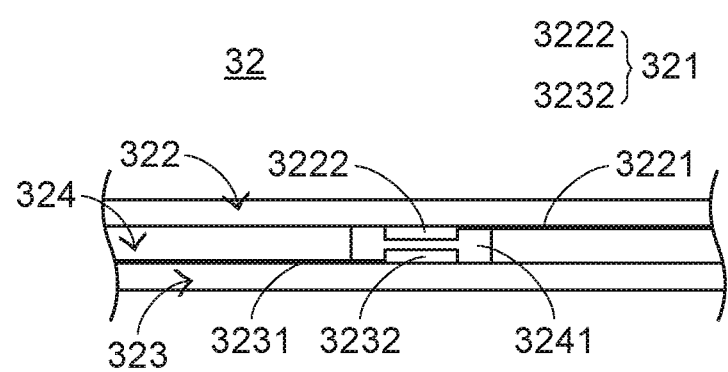
FIG. 8 is a schematic cross-sectional view illustrating the membrane wiring board of the keyboard device as shown in FIG. 5.

The membrane wiring board 32 further comprises plural film layers. FIG. 8 is a schematic cross-sectional view illustrating the membrane wiring board of the keyboard device as shown in FIG. 5. The plural film layers of the membrane wiring board 32 are arranged in a stack form. In this embodiment, the membrane wiring board 32 comprises an upper film layer 322 and a lower film layer 323. A first circuit pattern 3221 is formed on a bottom surface of the upper film layer 322. The first circuit pattern 3221 comprises plural upper contacts 3222 corresponding to the plural key structures 30. A second circuit pattern 3231 is formed on a top surface of the lower film layer 323. The second circuit pattern 3231 comprises plural lower contacts 3232 corresponding to the plural upper contacts 3222. Each of the upper contacts 3222 and the corresponding lower contact 3232 are separated from each other by a spacing interval. Moreover, each of the upper contacts 3222 and the corresponding lower contact 3232 are collectively defined as a membrane switch 321. Moreover, for maintaining the spacing interval between each upper contact 3222 and the corresponding lower contact 3232, the membrane wiring board 32 further comprises an intermediate film layer 324. The intermediate film layer 324 is arranged between the upper film layer 322 and the lower film layer 323. In addition, the intermediate film layer 324 comprises plural perforations 3241 corresponding to the plural upper contacts 3222 and the plural lower contacts 3232. Preferably but not exclusively, at least one of the upper film layer 322, the lower film layer 323 and the intermediate film layer 324 is made of polycarbonate (PC), polyethylene terephthalate (PET), polymethylmethacrylate (PMMA), polyurethane (PU) or polyimide (PI).

Figure 9:
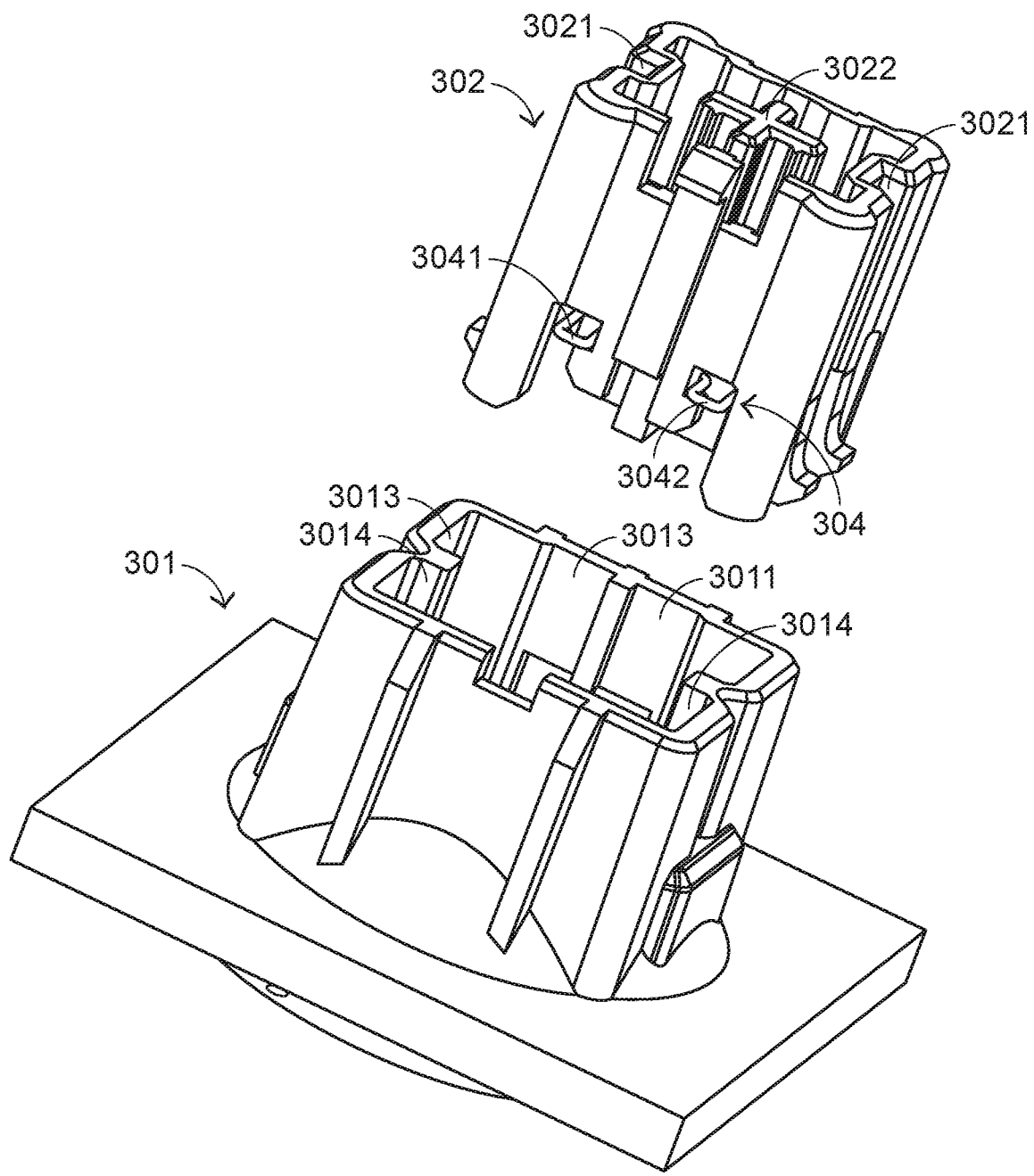
FIG. 9 is a schematic exploded view illustrating the key structure of the keyboard device as shown in FIG. 5 and taken along a viewpoint.
Figure 10:
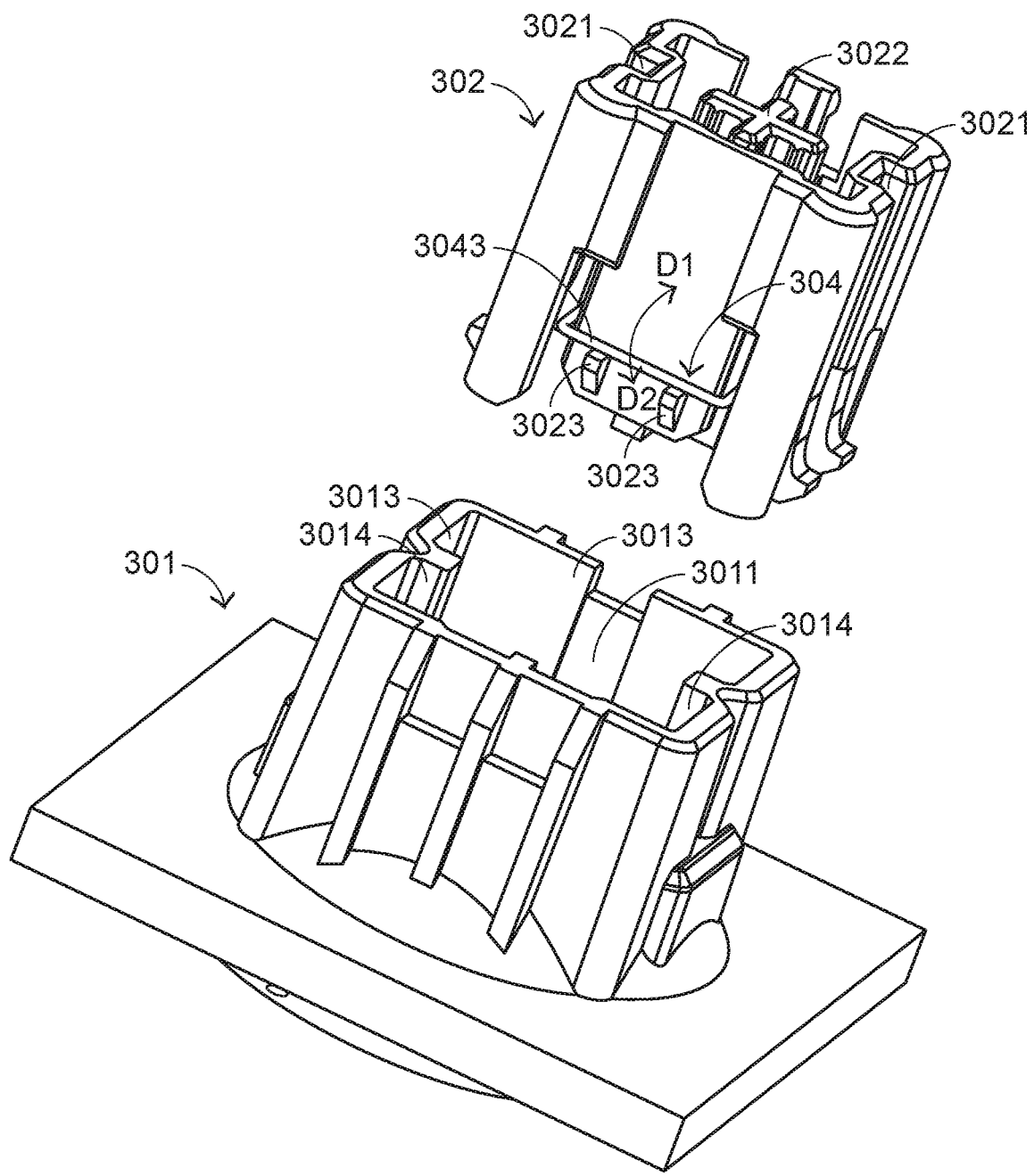
FIG. 10 is a schematic exploded view illustrating the key structure of the keyboard device as shown in FIG. 5 and taken along another viewpoint.
Figure 11:
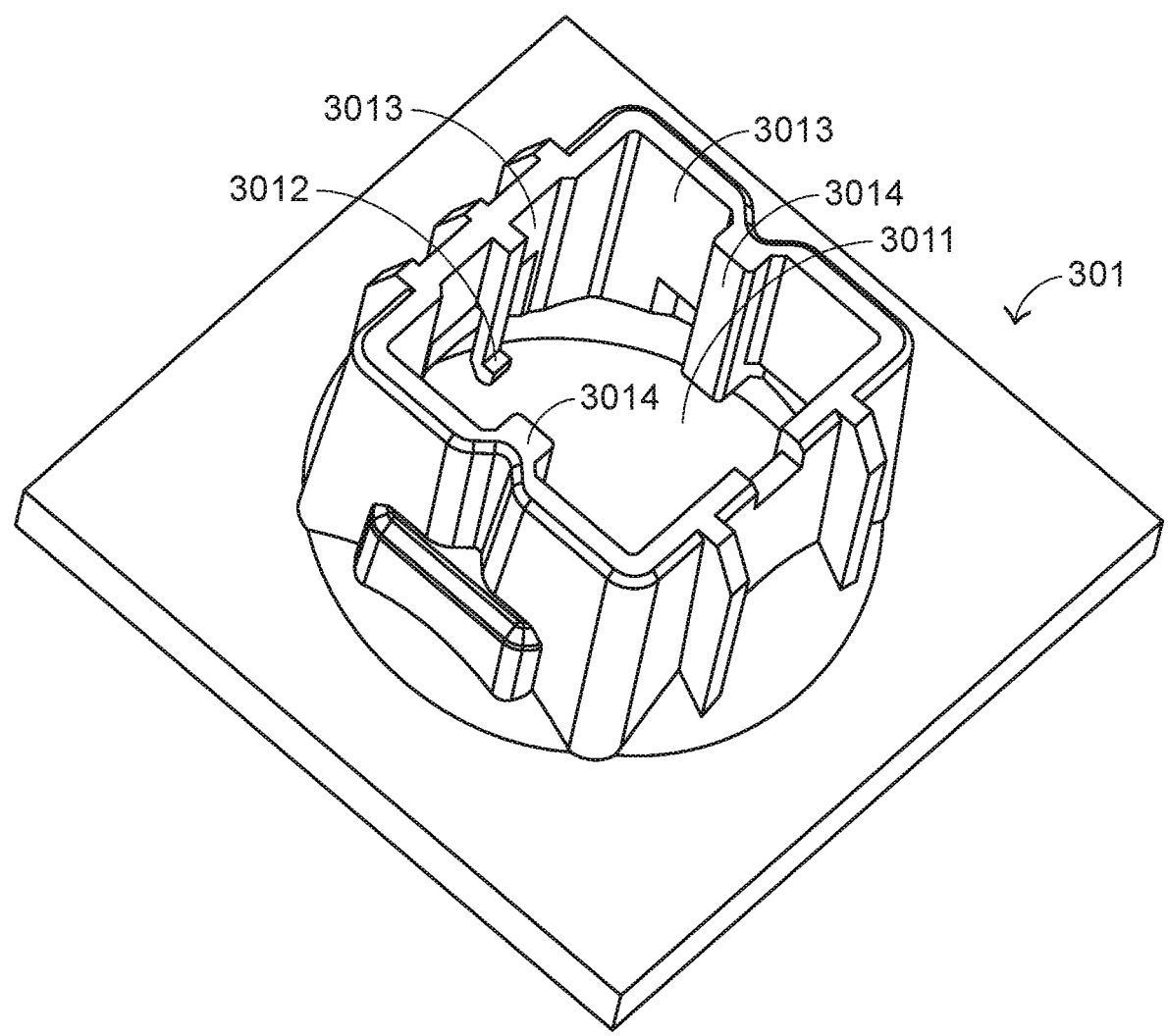
FIG. 11 is a schematic perspective view illustrating a sleeve of the key structure as shown in FIGS. 9 and 10.

Please refer to FIGS. 9, 10 and 11. FIG. 9 is a schematic exploded view illustrating the key structure of the keyboard device as shown in FIG. 5 and taken along a viewpoint. FIG. 10 is a schematic exploded view illustrating the key structure of the keyboard device as shown in FIG. 5 and taken along another viewpoint. FIG. 11 is a schematic perspective view illustrating a sleeve of the key structure as shown in FIGS. 9 and 10.

Each of the key structures 30 comprises a sleeve 301, a plunger-type support shaft 302, a keycap 303 and a resilience element 304. The sleeve 301 comprises a sliding groove 3011 and a stopping structure 3012. The stopping structure 3012 is disposed within the sliding groove 3011. The plunger-type support shaft 302 is movable upwardly or downwardly relative to the sliding groove 3011. A first end of the plunger-type support shaft 302 is inserted into the sliding groove 3011. A second end of the plunger-type support shaft 302 is connected with the keycap 303. The resilience element 304 is disposed on the plunger-type support shaft 302. Moreover, the resilience element 304 is movable with the plunger-type support shaft 302.

In this embodiment, the sliding groove 3011 of the sleeve 301 is defined by plural inner walls 3013 of the sleeve 301 collaboratively. The stopping structure 3012 is a raised structure that is protruded from one of the inner walls 3013 toward the middle region of the sliding groove 3011. Moreover, plural ribs 3014 are disposed on the inner walls 3013 of the sleeve 301 along the vertical direction. Moreover, plural sliding tracks 3021 are formed in an outer surface of the plunger-type support shaft 302 corresponding to the ribs 3014. As the sleeve 301 and the plunger-type support shaft 302 are guided by the ribs 3014 and the sliding tracks 3021, the sleeve 301 and the plunger-type support shaft 302 are movable relative to each other. It is noted that numerous modifications and alterations may be made while retaining the teachings of the invention. For example, in another embodiment, plural sliding tracks are formed in the inner walls 3013 of the sleeve 301 along the vertical direction, and plural ribs are formed on the outer surface of the plunger-type support shaft 302 corresponding to the sliding tracks.

In an embodiment, the keycap 303 comprises a first coupling structure 3031. The first coupling structure 3031 is disposed on a bottom surface of the keycap 303. The plunger-type support shaft 302 further comprises a second coupling structure 3022 corresponding to the first coupling structure 3031. The first coupling structure 3031 of the keycap 303 and the second coupling structure 3022 of the plunger-type support shaft 302 are coupled with each other. Consequently, the keycap 303 is detachably connected with the plunger-type support shaft 302. In such way, the keycap may be replaced with another keycap with a different color, shape or material. Preferably but not exclusively, the first coupling structure 3031 is a crisscross-shaped recess, and the second coupling structure 3022 is a crisscross-shaped rod. It is noted that numerous modifications and alterations may be made while retaining the teachings of the invention. For example, in another embodiment, the first coupling structure 3031 is a crisscross-shaped rod, and the second coupling structure 3022 is a crisscross-shaped recess.

In this embodiment, the resilience element 304 is a bent metallic wire, so that the resilience element 304 has a resilience property. Moreover, the resilience element 304 is arranged around the plunger-type support shaft 302. The resilience element 304 comprises a first end part 3041, a second end part 3042 and a swinging part 3043. The swinging part 3043 is arranged between the first end part 3041 and the second end part 3042. As shown in FIG. 9, the first end part 3041 and the second end part 3042 are fixed on the plunger-type support shaft 302. Consequently, as shown in FIG. 10, the swinging part 3043 can be twisted and swung in a first direction D1 or a second direction D2 by using the first end part 3041 and the second end part 3042 as fulcrums. In addition, the plunger-type support shaft 302 further comprises a supporting part 3023. The supporting part 3023 is protruded externally from the supporting part 3023. The swinging part 3043 of the resilience element 304 is supported on the supporting part 3023.

Figure 12A:
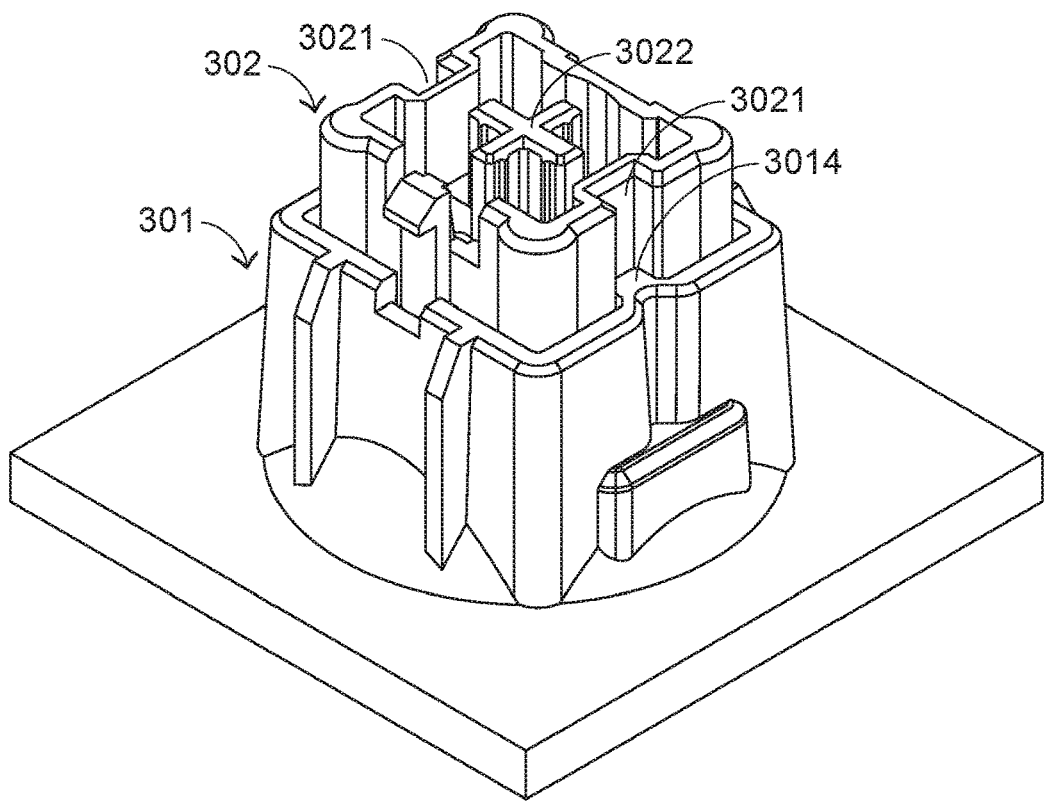
FIG. 12A is a schematic perspective view illustrating the sleeve and the plunger-type support shaft of the key structure of the keyboard device as shown in FIG. 5, in which the key structure is not depressed.
Figure 12B:
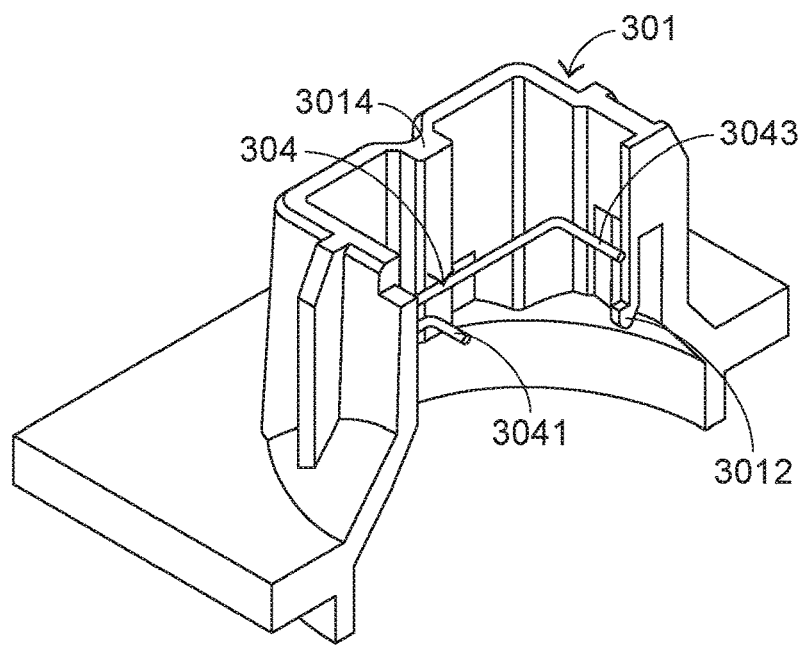
FIG. 12B is a schematic cutaway view illustrating the resilience element and the sleeve of the key structure of the keyboard device as shown in FIG. 5, in which the key structure is not depressed.

The operations of the keyboard device and the key structure of the present invention will be illustrated with reference to FIGS. 12A and 12B. FIG. 12A is a schematic perspective view illustrating the sleeve and the plunger-type support shaft of the key structure of the keyboard device as shown in FIG. 5, in which the key structure is not depressed. FIG. 12B is a schematic cutaway view illustrating the resilience element and the sleeve of the key structure of the keyboard device as shown in FIG. 5, in which the key structure is not depressed. When the keycap 303 of the key structure 30 is not depressed, the plunger-type support shaft 302 of the key structure 30 is supported by the elastic element 31 under the key structure 30. Meanwhile, the relationship between the sleeve 301 and the plunger-type support shaft 302 of the key structure 30 is shown in FIG. 12A, and the relationship between the sleeve 301 and the resilience element 304 is shown in FIG. 12B.

Figure 13A:
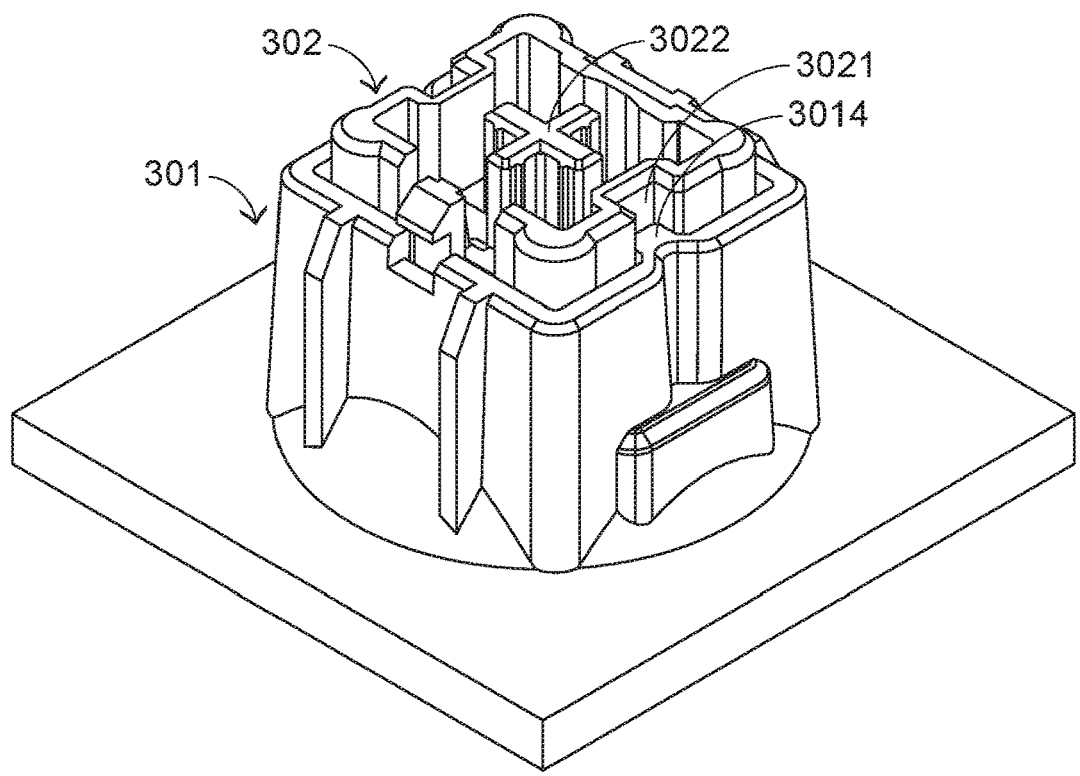
FIG. 13A is a schematic perspective view illustrating the sleeve and the plunger-type support shaft of the key structure of the keyboard device as shown in FIG. 5 while the key structure is depressed.
Figure 13B:
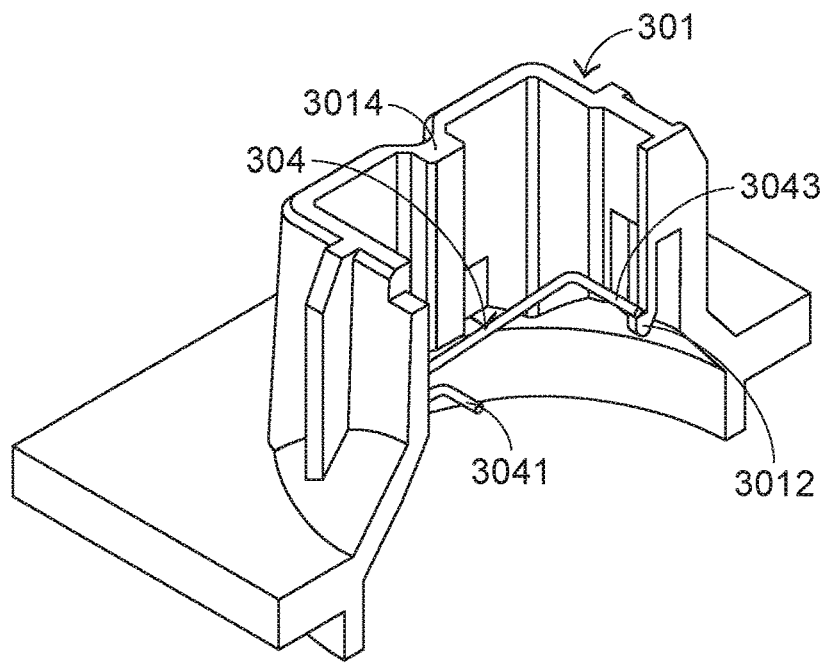
FIG. 13B is a schematic cutaway view illustrating the resilience element and the sleeve of the key structure of the keyboard device as shown in FIG. 5 while the key structure is depressed.

Please refer to FIGS. 7A, 7B, 13A and 13B. FIG. 13A is a schematic perspective view illustrating the sleeve and the plunger-type support shaft of the key structure of the keyboard device as shown in FIG. 5 while the key structure is depressed. FIG. 13B is a schematic cutaway view illustrating the resilience element and the sleeve of the key structure of the keyboard device as shown in FIG. 5 while the key structure is depressed. As mentioned above, the plunger-type support shaft 302 is connected with the keycap 303. Consequently, while the keycap 303 of the key structure 30 is depressed and moved downwardly relative to the membrane wiring board 32, the plunger-type support shaft 302 is moved downwardly relative to the sliding groove 3011 of the sleeve 301 to press the underlying elastic element 31. Meanwhile, the relationship between the sleeve 301 and the plunger-type support shaft 302 of the key structure 30 is shown in FIG. 13A. As the plunger-type support shaft 302 is moved downwardly, the resilience element 304 on the plunger-type support shaft 302 is correspondingly moved downwardly. Consequently, as shown in FIG. 13B, the swinging part 3043 of the resilience element 304 is correspondingly contacted with the stopping structure 3012 of the sleeve 301.

Figure 14A:
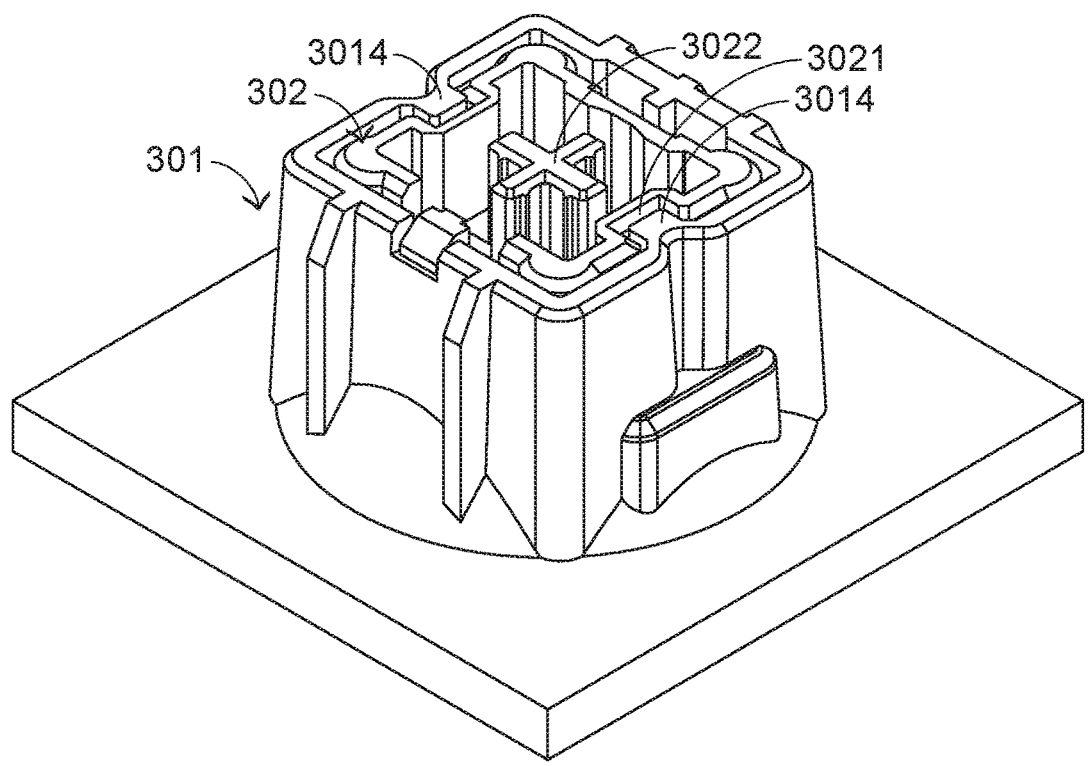
FIG. 14A is a schematic perspective view illustrating the sleeve and the plunger-type support shaft of the key structure of the keyboard device as shown in FIG. 5 when the key structure is completely depressed.
Figure 14B:
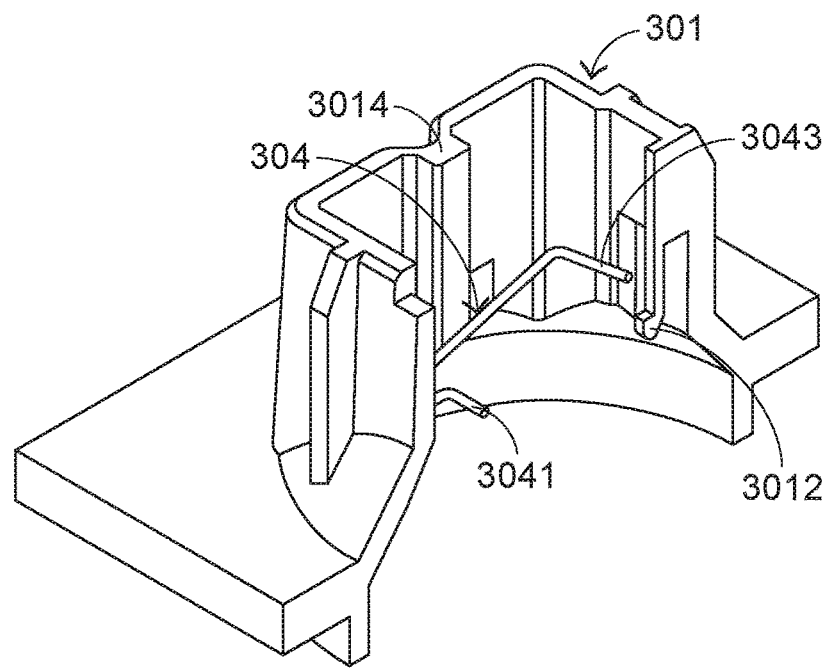
FIG. 14B is a schematic cutaway view illustrating the resilience element and the sleeve of the key structure of the keyboard device as shown in FIG. 5 when the key structure is completely depressed.

Please refer to FIGS. 7A, 7B, 8, 14A and 14B. FIG. 14A is a schematic perspective view illustrating the sleeve and the plunger-type support shaft of the key structure of the keyboard device as shown in FIG. 5 when the key structure is completely depressed. FIG. 14B is a schematic cutaway view illustrating the resilience element and the sleeve of the key structure of the keyboard device as shown in FIG. 5 when the key structure is completely depressed. When the keycap 303 of the key structure 30 is completely depressed, the keycap 303 moved downwardly relative to the membrane wiring board 32 and moved to the lowest position. Meanwhile, the relationship between the sleeve 301 and the plunger-type support shaft 302 of the key structure 30 is shown in FIG. 14A. Moreover, as the elastic element 31 is pressed by the plunger-type support shaft 302, the upper contact 3222 of the membrane wiring board 32 is pushed by the elastic element 31. After the upper contact 3222 is penetrated through the perforation 3241, the upper contact 3222 is contacted with the lower contact 3232. Consequently, the corresponding membrane switch 321 is electrically conducted, and the keyboard device 3 issues a corresponding key signal.

When the keycap 303 of the key structure 30 is completely depressed and moved to the lowest position, the swinging part 3043 of the resilience element 304 and the stopping structure 3012 of the sleeve 301 interfere with each other. Due to the interference, the swinging part 3043 of the resilience element 304 is twisted and swung in the first direction D1 (see FIG. 14B). As the swinging part 3043 is twisted and swung in the first direction D1, the outer surface of the plunger-type support shaft 302 is clicked by the swinging part 3043, or the swinging part 3043 is rubbed against the inner walls of the sleeve 301. Consequently, the operating sound and the operating feedback are generated. When the keycap 303 of the key structure 30 is no longer depressed, the plunger-type support shaft 302 connected with the keycap 303 is moved upwardly relative to the sliding groove 3011 of the sleeve 301 in response to the elastic force of the elastic element 31. At the same time, the swinging part 3043 of the resilience element 304 and the stopping structure 3012 of the sleeve 301 do not interfere with each other. Consequently, the swinging part 3043 is restored and swung in the second direction D2. Under this circumstance, the supporting part 3023 of the plunger-type support shaft 302 is clicked by the swinging part 3043, or the swinging part 3043 is rubbed against the inner walls of the sleeve 301. Consequently, the operating sound and the operating feedback are generated again.

From the above descriptions, the present invention provides a keyboard device with a membrane switch. The keyboard device is slim has reduced fabricating cost. The resilience element is disposed on the plunger-type support shaft of the key structure. The resilience element and the sleeve may interfere with each other. Consequently, the keyboard device provides the operating sound and the operating feedback like a mechanical switch. In other words, the keyboard device of the present invention is industrially valuable. The keyboard device is suitably applied to an electronic sports product, e.g., a keyboard device for the electronic sports game.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all modifications and similar structures.

What is claimed is:

1. A key structure, comprising:
   a sleeve comprising a sliding groove and a stopping structure, wherein the stopping structure is disposed within the sliding groove;
   a plunger-type support shaft, wherein a first end of the plunger-type support shaft is inserted into the sliding groove, and the plunger-type support shaft is movable upwardly or downwardly relative to the sliding groove;
   a keycap connected with a second end of the plunger-type support shaft; and
   a resilience element disposed on the plunger-type support shaft and movable with the plunger-type support shaft, wherein the resilience element comprises a first end part, a second end part and a swinging part, and the swinging part is arranged between the first end part and the second end part, wherein the first end part and the second end part are fixed on the plunger-type support shaft, wherein while the plunger-type support shaft is moved upwardly or downwardly relative to the sliding groove, the swinging part interferes with the stopping structure, so that the swinging part is swung,
   wherein while the plunger-type support shaft is moved upwardly or downwardly relative to the sliding groove, the resilience element and the stopping structure interfere with each other, so that the key structure generates an operating sound.

2. The key structure according to claim 1, wherein the plunger-type support shaft further comprises a supporting part, wherein the supporting part protrudes externally from the plunger-type support shaft, and the swinging part is supported on the supporting part.

3. The key structure according to claim 1, wherein the resilience element is a bent metallic wire that is arranged around the plunger-type support shaft.

4. The key structure according to claim 1, wherein the sleeve comprises plural inner walls, and the sliding groove is defined by the plural inner walls collaboratively, wherein the stopping structure is a raised structure that is protruded from one of the plural inner walls toward a middle region of the sliding groove.

5. The key structure according to claim 1, wherein the sleeve comprises plural inner walls, and the sliding groove is defined by plural inner walls collaboratively, wherein at least one rib is formed on the plural inner walls and at least one sliding track corresponding to the at least one rib is formed in the plunger-type support shaft, or at least one sliding track is formed in the plural inner walls and at least one rib corresponding to the at least one sliding track is formed on the plunger-type support shaft.

6. The key structure according to claim 1, wherein the keycap comprises a first coupling structure, and the plunger-type support shaft comprises a second coupling structure, wherein the first coupling structure and the second coupling structure are coupled with each other, so that the keycap is detachably connected with the plunger-type support shaft.

7. The key structure according to claim 6, wherein one of the first coupling structure and the second coupling structure is a crisscross-shaped recess, and the other of the first coupling structure and the second coupling structure is a crisscross-shaped rod.

8. A keyboard device, comprising:
   a key structure comprising:
     a sleeve comprising a sliding groove and a stopping structure, wherein the stopping structure is disposed within the sliding groove;
     a plunger-type support shaft, wherein a first end of the plunger-type support shaft is inserted into the sliding groove, and the plunger-type support shaft is movable upwardly or downwardly relative to the sliding groove;
     a keycap connected with a second end of the plunger-type support shaft; and
     a resilience element disposed on the plunger-type support shaft and movable with the plunger-type support shaft, wherein the resilience element comprises a first end part, a second end part and a swinging part, and the swinging part is arranged between the first end part and the second end part, wherein the first end part and the second end part are fixed on the plunger-type support shaft, wherein while the plunger-type support shaft is moved upwardly or downwardly relative to the sliding groove, the swinging part interferes with the stopping structure, so that the swinging part is swung,
     wherein while the plunger-type support shaft is moved upwardly or downwardly relative to the sliding groove, the resilience element and the stopping structure interfere with each other, so that the key structure generates an operating sound;
   a membrane wiring board comprising a membrane switch; and
   an elastic element arranged between the key structure and the membrane wiring board, wherein when the elastic element is pressed by the plunger-type support shaft, the membrane switch is triggered by the elastic element.

9. The keyboard device according to claim 8, wherein the plunger-type support shaft further comprises a supporting part, wherein the supporting part protrudes externally from the plunger-type support shaft, and the swinging part is supported on the supporting part.

10. The keyboard device according to claim 8, wherein the resilience element is a bent metallic wire that is arranged around the plunger-type support shaft.

11. The keyboard device according to claim 8, wherein the sleeve comprises plural inner walls, and the sliding groove is defined by plural inner walls collaboratively, wherein the stopping structure is a raised structure that is protruded from one of the plural inner walls toward a middle region of the sliding groove.

12. The keyboard device according to claim 8, wherein the sleeve comprises plural inner walls, and the sliding groove is defined by the plural inner walls collaboratively, wherein at least one rib is formed on the plural inner walls and at least one sliding track corresponding to the at least one rib is formed in the plunger-type support shaft, or at least one sliding track is formed in the plural inner walls and at least rib corresponding to the at least one sliding track is formed on the plunger-type support shaft.

13. The keyboard device according to claim 8, wherein the keycap comprises a first coupling structure, and the plunger-type support shaft comprises a second coupling structure, wherein the first coupling structure and the second coupling structure are coupled with each other, so that the keycap is detachably connected with the plunger-type support shaft.

14. The keyboard device according to claim 13, wherein one of the first coupling structure and the second coupling structure is a crisscross-shaped recess, and the other of the first coupling structure and the second coupling structure is a crisscross-shaped rod.

\* \* \* \* \*